United States Patent
Kim et al.

(10) Patent No.: US 12,455,096 B2
(45) Date of Patent: *Oct. 28, 2025

(54) BLOWER

(71) Applicant: LG ELECTRONICS INC., Seoul (KR)

(72) Inventors: Yongmin Kim, Seoul (KR); Hoojin Kim, Seoul (KR); Chiyoung Choi, Seoul (KR); Hyungho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

This patent is subject to a terminal disclaimer.

(21) Appl. No.: 18/222,737

(22) Filed: Jul. 17, 2023

(65) Prior Publication Data
US 2023/0358244 A1    Nov. 9, 2023

Related U.S. Application Data

(63) Continuation of application No. 17/332,681, filed on May 27, 2021, now Pat. No. 11,739,760.

(30) Foreign Application Priority Data

Jun. 2, 2020  (KR) .................. 10-2020-0066278
Jun. 2, 2020  (KR) .................. 10-2020-0066279
Jun. 2, 2020  (KR) .................. 10-2020-0066280

(51) Int. Cl.
F24F 13/10    (2006.01)
F04D 29/44    (2006.01)
(Continued)

(52) U.S. Cl.
CPC ............ *F24F 13/10* (2013.01); *F04D 29/441* (2013.01); *F04F 5/16* (2013.01); *F24F 1/01* (2013.01);
(Continued)

(58) Field of Classification Search
CPC .... F24F 1/01; F24F 13/08; F24F 13/10; F24F 2013/205; F04F 5/16; F04D 29/441
See application file for complete search history.

(56) References Cited

U.S. PATENT DOCUMENTS 2,074,518 A    3/1937  Sandberg
6,760,543 B1   7/2004  Orr
(Continued)

FOREIGN PATENT DOCUMENTS

CN    101825099    9/2010
CN    102374659    3/2012
(Continued)

OTHER PUBLICATIONS

Fujisono, Machine Translation of JP-6650562 (Year: 2020).*
(Continued)

*Primary Examiner* — Courtney D Heinle
*Assistant Examiner* — Michael K. Reitz
(74) *Attorney, Agent, or Firm* — KED & ASSOCIATES

(57) ABSTRACT

A blower may include a lower case having a suction port, a fan provided inside the lower case, an upper case provided above the lower case and having a space through which air blown from the fan flows, a discharge port penetrating the upper case and formed to be elongated, and a flow guide provided in the space and extending in a direction crossing a longitudinal direction of the discharge port.

12 Claims, 12 Drawing Sheets

(51) Int. Cl.
*F04F 5/16* (2006.01)
*F24F 1/01* (2011.01)
*F24F 13/08* (2006.01)
*F24F 13/20* (2006.01)

(52) U.S. Cl.
CPC ........ *F24F 13/08* (2013.01); *F24F 2013/205* (2013.01)

(56) References Cited

U.S. PATENT DOCUMENTS

| | | | |
|---|---|---|---|
| 7,158,716 | B2 | 1/2007 | Shapiro |
| 7,699,580 | B2 | 4/2010 | Lasko |
| 10,184,495 | B2 | 1/2019 | Lyer |
| 2006/0199515 | A1 | 9/2006 | Lasko |
| 2007/0129001 | A1* | 6/2007 | Orr .................. F24F 11/0001 454/239 |
| 2010/0226752 | A1 | 9/2010 | Gammack et al. |
| 2012/0051884 | A1* | 3/2012 | Junkel .................. F04F 5/16 415/90 |
| 2013/0129490 | A1* | 5/2013 | Dos Reis .............. F04D 3/00 415/182.1 |
| 2013/0309065 | A1* | 11/2013 | Johnson ............ F04D 29/665 415/119 |
| 2014/0147297 | A1* | 5/2014 | Iyer .................... F04F 5/14 417/158 |
| 2014/0255173 | A1 | 9/2014 | Poulton et al. |
| 2016/0033148 | A1* | 2/2016 | Darvill ................. F04F 5/16 210/143 |
| 2019/0170157 | A1* | 6/2019 | Mogridge ............ F04D 25/08 |

FOREIGN PATENT DOCUMENTS

| | | | |
|---|---|---|---|
| CN | 103470543 | 12/2013 | |
| CN | 206877265 | 1/2018 | |
| CN | 208982379 | 6/2019 | |
| CN | 113357204 | 9/2021 | |
| CN | 113669307 | 11/2021 | |
| CN | 113669308 | 11/2021 | |
| CN | 113757141 | 12/2021 | |
| CN | 113757142 | 12/2021 | |
| CN | 113757190 | 12/2021 | |
| CN | 114829782 | 7/2022 | |
| CN | 115003966 | 9/2022 | |
| JP | 2013-015114 | 1/2013 | |
| JP | 2018-135765 | 8/2018 | |
| JP | 6650562 B2 * | 2/2020 | ............ F04D 25/08 |
| KR | 10-2011-0099318 | 9/2011 | |
| KR | 10-2013-0033435 | 4/2013 | |
| KR | 10-2018-0125425 | 11/2018 | |

OTHER PUBLICATIONS

European Search Report issued in Application No. 21176512.8 dated Oct. 18, 2021.
Chinese Office Action dated Dec. 29, 2022 issued in Application No. 202110590132.4.
Korean Office Action dated Apr. 6, 2023 issued in Application No. 10-2020-0066278.
Korean Office Action dated Apr. 6, 2023 issued in Application No. 10-2020-0066279.
Korean Office Action dated Apr. 6, 2023 issued in Application No. 10-2020-0066280.

* cited by examiner

BLOWER

CROSS-REFERENCE TO RELATED APPLICATIONS

This application is a Continuation of U.S. application Ser. No. 17/332,681, filed on May 27, 2021, which claims priority under 35 U.S.C. § 119 to Korean Application Nos. 10-2020-0066278 filed on Jun. 2, 2020, 10-2020-0066279 filed on Jun. 2, 2020, and 10-2020-0066280 filed on Jun. 2, 2020, whose entire disclosures are hereby incorporated by reference.

BACKGROUND

1. Field

The present disclosure relates to a blower.

2. Background

A blower may create a flow of air to circulate air in an indoor space or to guide an air flow toward a user. When the blower is provided with a filter, the blower may improve indoor air quality by purifying contaminated air in a room. The blower may include a discharge port through which air pressurized by the fan is discharged to an outside of a case.

To supply clean air to a high location, blowers having a plurality of discharge ports arranged vertically or having an extended vertical length have been manufactured. However, such a blower does not have a structure that evenly distributes air pressurized by the fan, and there is a problem in that clean air is intensively supplied to only a local area.

BRIEF DESCRIPTION OF THE DRAWINGS

The embodiments will be described in detail with reference to the following drawings in which like reference numerals refer to like elements wherein.

DETAILED DESCRIPTION

Figure 1:
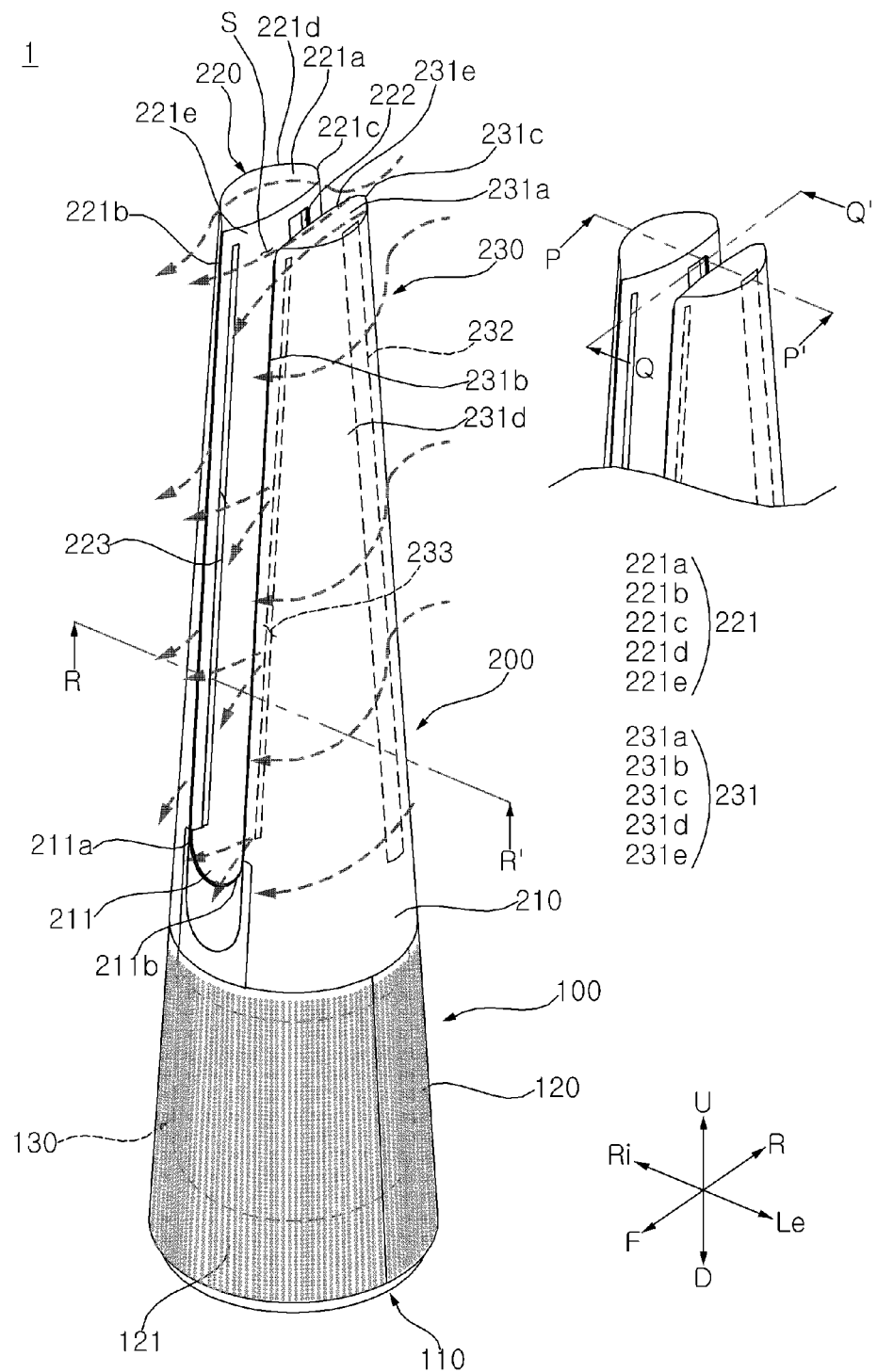
FIG. 1 is a perspective view of a blower according to an embodiment.

Referring to FIG. 1, the blower 1 may alternatively be referred to or implemented as an air conditioner, an air clean fan, or an air purifier where air is suctioned and the suctioned air is circulated.

The blower 1 according to the embodiments of the present disclosure may include a suction module or assembly 100 through which air is suctioned and a blowing module or assembly 200 through which the suctioned air is discharged.

The blower 1 may have a column or cone shape whose diameter decreases upward or toward the blowing module 200, and the blower 1 may have a shape of a cone or truncated cone as a whole. As a cross-section and/or weight increases toward a bottom, a center of gravity may be lowered, reducing a risk of tipping. However, configuring the cross section to narrow toward the top is not necessary.

The suction module 100 may have a cross-sectional arear or diameter that gradually decreases the top. The blowing module 200 may also have a cross-sectional area or diameter that gradually decreases toward the top. The blowing module 200 may be provided above the suction module 100, and diameters of the suction module 100 and blowing module 200 may be configured such that a transition appears smooth or seamless.

The suction module 100 may include a base 110, a lower case 120 provided above the base 110, and a filter 130 provided inside the lower case 120. The base 110 may be seated on a ground, floor, or other surface and may support a weight of the rest of the blower 1. The lower case 120 and the filter 130 may be placed in the upper side of the base 110.

An outer shape of the lower case 120 may be conical (or alternatively cylindrical), and a space in which the filter 130 is provided may be formed inside the lower case 120. The lower case 120 may have a suction port 121 opened to an inside of the lower case 120. A plurality of suction ports 121 may be formed along a circumferential surface of the lower case 120.

An outer shape of the filter 130 may be cylindrical (or alternatively, conical). Foreign matter contained in the air introduced through the suction port 121 may be filtered by the filter 130.

The blowing module 200 may have a slot or opening penetrating a middle portion so as to appear to be separated and having two columns extending vertically. The slot or opening may define a blowing space S described in more detail later. The blowing module 200 may include a first tower or extension 220 and a second tower or extension 230 spaced apart from each other. The blowing module 200 may include a tower base or connector 210 connecting the first tower 220 and the second tower 230 to the suction module 100. The tower base 210 may be above an upper side of the suction module 100 and may be provided at a lower side of the first and second tower 220 and 230.

An outer shape of the tower base 210 may be conical (or alternatively, cylindrical), and the tower base 210 may be provided on an upper surface of the suction module 100 to form an outer circumferential surface continuous with the suction module 100.

An upper surface 211 of the tower base 210, hereinafter called the tower base upper surface 211, may be concaved downward to form a recess or groove extending forward and backward. The first tower 220 may extend upward from a first side 211a (e.g., a left side) of the tower base upper surface 211, and the second tower 230 may extend upward from the a second side 211b (e.g., a right side) of the tower base upper surface 211.

The tower base 210 may distribute filtered air supplied from an inside of the suction module 100 and provide the distributed air to the first tower 220 and the second tower 230. The tower base 210, the first tower 220, and the second tower 230 may be manufactured as separate components, or alternatively may be manufactured integrally. The tower base 210 and the first tower 220 may form a first continuous outer circumferential surface of the blower 1, and the tower base 210 and the second tower 230 may form a second continuous outer circumferential surface of the blower 1.

As an alternative to the embodiment shown in FIG. 1, the first tower 220 and the second tower 230 may be directly assembled to the suction module 100 without the tower base 210 or may be manufactured integrally with the suction module 100.

The first tower 220 and the second tower 230 may be spaced apart from each other, and a blowing space S may be formed between the first tower 220 and the second tower 230.

The blowing space S may be understood as a space between the first and second towers 220 and 230 which has open front, rear, and upper sides. The outer shape of the blowing module 200 including the first tower 220, the second tower 230, and the blowing space S may be a conical (or alternatively, cylindrical) shape. First and second discharge ports 222 and 232 respectively formed in the first tower 220 and the second tower 230 may discharge air toward the blowing space S.

The first tower 220 and the second tower 230 may be provided symmetrically with respect to the blowing space S so that an air flow is uniformly distributed in the blowing space S, facilitating control of a horizontal airflow and a rising airflow. The first tower 220 may include a first tower case 221 forming an outer shape of the first tower 220, and the second tower 230 may include a second tower case 231 forming an outer shape of the second tower 230. The tower base 210, the first tower case 221, and the second tower case 231 may be referred to as an upper case which is provided above the lower case 120 and has first and second discharge ports 222 and 232 through which air is discharged. The lower case 120 and the upper case defined by the tower base 210, first tower case 221, and second tower 231 may collectively be referred to as a "case."

The first discharge port 222 may be formed in the first tower 220 to extend vertically, and the second discharge port 232 may be formed in the second tower 230 to extend vertically. A flow direction of the air discharged from the first tower 220 and the second tower 230 may be formed in the front and rear direction.

A width of the blowing space S, which may be defined by a distance between the first tower 220 and the second tower 230, may be constant in the vertical direction. Alternatively, the width of the blowing space S may increase or decrease in the vertical direction.

Air flowing to a front of the blowing space S may be evenly distributed in the vertical direction by making the width of the blowing space S constant along the vertical direction. If a width of an upper side of the blowing space S differs from the width of a lower side of the blowing space S, a flow speed at the wider side may be lower than at the narrower side, and a deviation of speed may occur in the vertical direction. When a deviation of air flow speed occurs in the vertical direction, an amount of clean air supplied may vary according to a vertical position from which the air is discharged.

Air discharged from each of the first discharge port 222 and the second discharge port 232 may be supplied to a user after being joined in the blowing space S. The air discharged from the first discharge port 222 and the air discharged from the second discharge port 232 may not flow individually to the user, but may be supplied to the user after combining or mixing in the blowing space S.

An indirect airflow may be formed in the air around the blower 1 due to air discharged to the blowing space S such that the air around the blower 1 may also flow toward the blowing space S. Since the discharged air of the first discharge port 222 and the discharged air of the second discharge port 232 are joined in the blowing space S, a straightness or steadiness of the joined discharged air may be improved. By joining the discharged air in the blowing space S, the air around the first tower 220 and the second tower 230 may also be induced to flow forward along an outer circumferential surface of the blowing module 200.

The first tower case 221 may include a first tower upper end 221a forming an upper surface of the first tower 220, a first tower front end 221b forming a front surface of the first tower 220, a first tower rear end 221c forming a rear surface of the first tower 220, a first outer wall 221d forming an outer circumferential surface of the first tower 220, and a first inner wall 221e forming an inner surface of the first tower 220 facing the blowing space S.

Similarly, the second tower case 231 may include a second tower upper end 231a forming an upper surface of the second tower 230, a second tower front end 231b forming a front surface of the second tower 230, a second tower rear end 231c forming a rear surface of the second tower 230, a second outer wall 231d forming an outer circumferential surface of the second tower 230, and a second inner wall 231e forming an inner surface of the second tower 230 facing the blowing space S.

The first outer wall 221d and the second outer wall 231d may be formed to curve convexly outward in to radial direction so that outer circumferential surfaces of each of the first tower 220 and the second tower 230 are curved. The first inner wall 221e and the second inner wall 231e may be formed to curve convex inward toward the blowing space S in the radial direction so inner circumferential surfaces of each of the first tower 220 and the second tower 230 are curved.

The first discharge port 222 may be formed in the first inner wall 221e and extend in the vertical direction. The first discharge port 222 may be opened inward in the radial direction. The second discharge port 232 may be formed in the second inner wall 231e and extend in the vertical direction. The second discharge port 232 may be opened inward in the radial direction.

The first discharge port 222 may be positioned closer to the first tower rear end 221c than the first tower front end 221b. The second discharge port 232 may be positioned closer to the second tower rear end 231c than the second tower front end 231b.

A first board slit 223 may be formed in the first inner wall 221e to extend vertically. A second board slit 233 may be formed in the second inner wall 231e to extend vertically. The first board slit 223 and the second board slit 233 may be formed to be opened inward in the radial direction. A first airflow converter 401 (FIG. 6) described later may pass through the first board slit 223 and a second airflow converter 402 (FIG. 6) described later may pass through the second board slit 233.

The first board slit 223 may be positioned closer to the first tower front end 221b than the first tower rear end 221c. The second board slit 233 may be positioned closer to the second tower front end 231*b* than the second tower rear end 231*c*. The first board slit 223 and the second board slit 233 may face each other.

Figure 2:
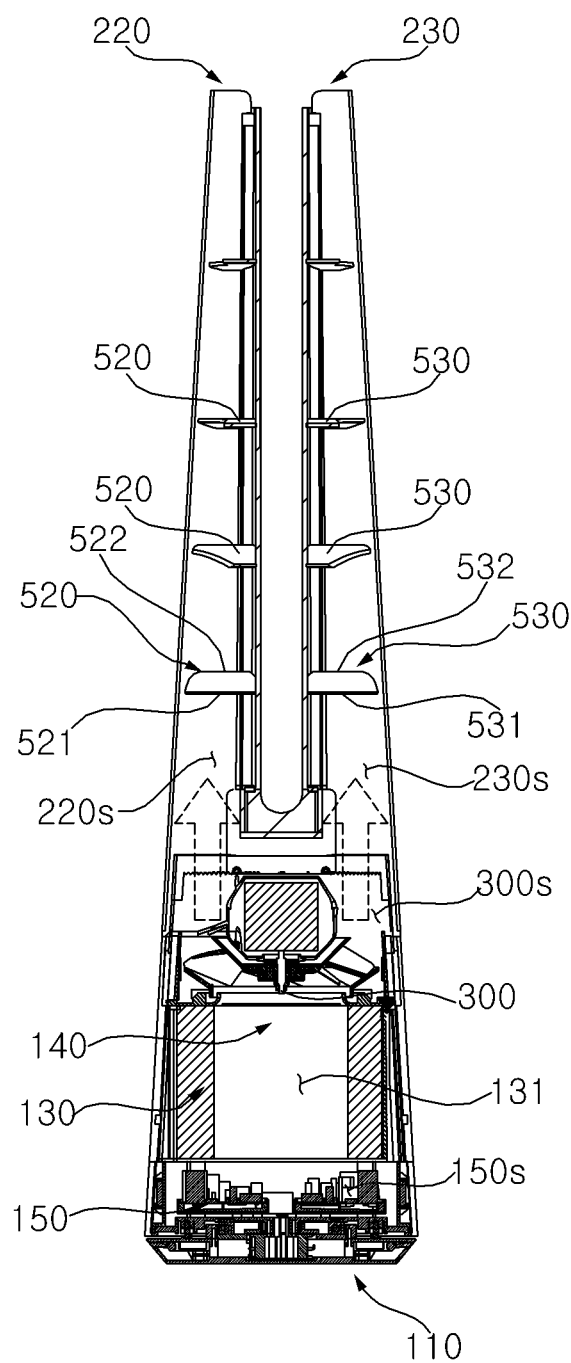
FIG. 2 is a vertical cross-sectional perspective view of the blower shown in FIG. 1 on a P-P' line.
Figure 3:
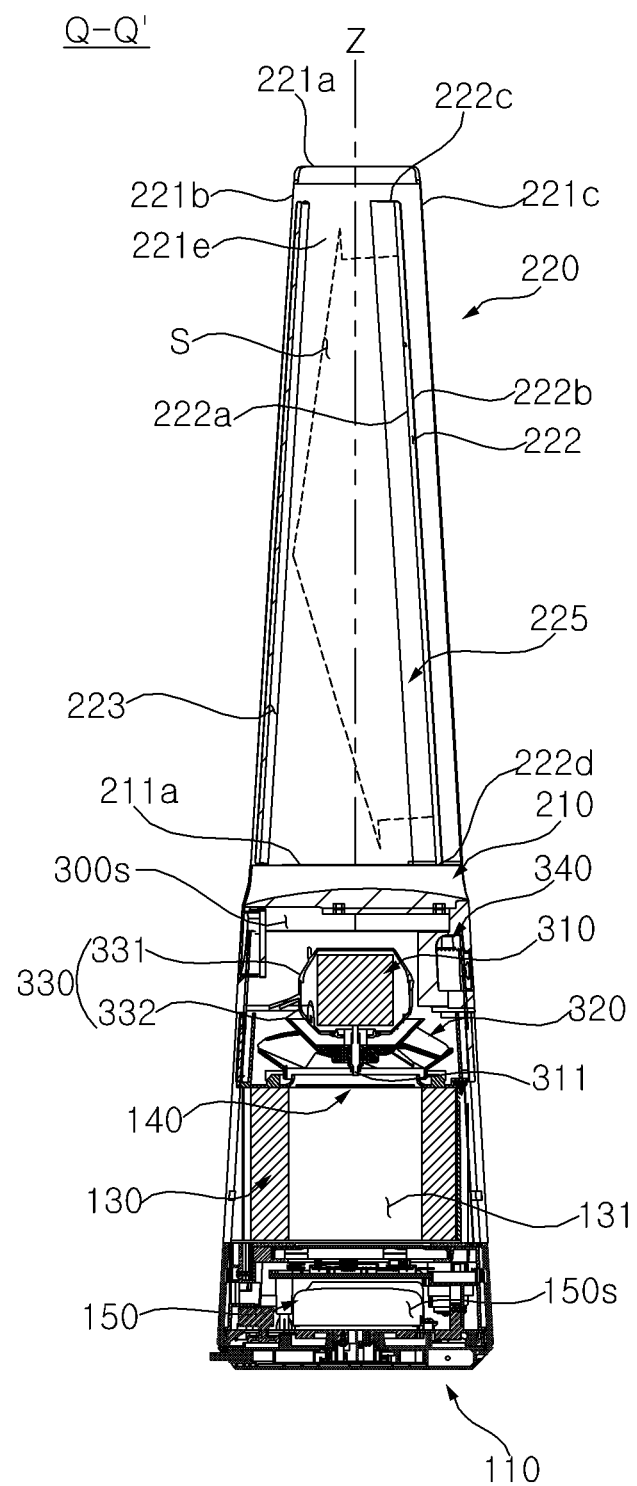
FIG. 3 is a vertical cross-sectional perspective view of the blower shown in FIG. 1 on a Q-Q' line.

Hereinafter, an internal structure of the blower 1 will be described with reference to FIGS. 2 and 3. FIG. 2 is a cross-sectional view of the blower 1 cut along the line P-P' shown in FIG. 1, and FIG. 3 is a cross-sectional view showing the blower 1 along the line Q-Q' shown in FIG. 1.

Referring to FIG. 2, a substrate assembly or controller 150 (e.g., printed circuit board or PCB assembly) to control an operation of a fan assembly 300 may be provided in an upper side of the base 110. A control space 150S in which the substrate assembly 150 is provided may be formed in the upper side of the base 110.

The filter 130 may be provided above the control space 150S. The filter 130 may have a hollow cylindrical shape, and a cylindrical filter hole 131 or hollow opening may be formed inside the filter 130. Air introduced through the suction port 121 may pass through the filter 130 and flow to the filter hole 131.

A suction grill 140 may be provided above the filter 130. Air flowing upward through the filter 130 may pass through the suction grill 140. The suction grill 140 may be provided between the fan assembly 300 and the filter 130. When the lower case 210 is removed and the filter 130 is separated from the blower 1, the suction grill 140 may prevent a user's hand from contacting the fan assembly 300.

The fan assembly 300 may be provided in the upper side of the filter 130 and may generate a suction force for air outside the blower 1. By driving the fan assembly 300, ambient air outside the blower 1 may be suctioned through the suction port 121 and the filter hole 131 sequentially to flow to the first tower 220 and the second tower 230.

A pressurizing space 300*s* in which the fan assembly 300 is provided may be formed between the filter 130 and the blowing module 200. A first distribution space 220*s* may be formed inside the first tower 220, and a second distribution space 230*s* may be formed inside the second tower 230. Air that passes through the pressurizing space 300*s* may flow upward through the first or second distribution spaces 220*s* or 230*s*. The tower base 210 may distribute the air that passed through the pressurizing space 300*s* into the first distribution space 220*s* and the second distribution space 230*s*. The tower base 210 may form a channel connecting the first and second towers 220 and 230 and the fan assembly 300.

The first distribution space 220*s* may be formed between the first outer wall 221*d* and the first inner wall 221*e*. The second distribution space 230*s* may be formed between the second outer wall 231*d* and the second inner wall 231*e*.

The first tower 220 may include a first flow guide or air guide 520 that guides a flow direction of the air inside the first distribution space 220*s*. A plurality of first flow guides 520 may be provided to be spaced apart from each other vertically.

The first flow guide 520 may be formed to protrude from the first tower rear end 221*c* toward the first tower front end 221*b*. The first flow guide 520 may be spaced apart from the first tower front end 221*b* in the front-rear direction. The first flow guide 520 may extend obliquely downward while progressing toward the front. An angle at which each of the plurality of first flow guides 520 is inclined downward may decrease as the first flow guide 520 progresses upward.

The second tower 230 may include a second flow guide or air guide 530 that guides a flow direction of the air inside the second distribution space 230*s*. A plurality of second flow guides 530 may be provided to be spaced apart from each other vertically.

The second flow guide 530 may be formed to protrude from the second tower rear end 231*c* toward the second tower front end 231*b*. The second flow guide 530 may be spaced apart from the second tower front end 231*b* in the front-rear direction. The second flow guide 530 may extend obliquely downward while progressing toward the front. An angle at which each of the plurality of second flow guides 530 is inclined downward may decrease as the second flow guide 530 progresses upward.

The first flow guide 520 may guide the air discharged from the fan assembly 300 to flow toward the first discharge port 222. The second flow guide 530 may guide the air discharged from the fan assembly 300 to flow toward the second discharge port 232.

Referring to FIG. 3, the fan assembly 300 may include a fan motor 310 which generates power, a motor housing 330 which receives the fan motor 310, a fan 320 which is rotated by receiving power from the fan motor 310, and a diffuser 340 which guides the flow direction of the air pressurized by the fan 320.

The fan motor 310 may be provided at an upper side of the fan 320 and may be connected to the fan 320 through a motor shaft 311 extending downward from the fan motor 310. The motor housing 330 may include a first or upper motor housing 331 covering an upper portion of the fan motor 310 and a second or lower motor housing 332 covering a lower portion of the fan motor 310.

The first discharge port 222 may be provided in the upper side of the tower base 210. A first discharge port lower end 222*d* may join with or be provided in the upper side of the tower base upper surface 211.

The first discharge port 222 may spaced apart from the lower side of the first tower upper end 221*a*. A first discharge port upper end 222*c* may be formed to be spaced apart from the lower side of the first tower upper end 221*a*.

The first discharge port 222 may obliquely extend in the vertical direction to be inclined. The first discharge port 222 may be inclined forward while progressing upward. The first discharge port 222 may obliquely extend rearward with respect to a vertical axis Z extending in the vertical direction.

A first discharge port front end 222*a* and a first discharge port rear end 222*b* may extend obliquely in the vertical direction, and may extend parallel to each other. The first discharge port front end 222*a* and the first discharge port rear end 222*b* may be inclined rearward with respect to the vertical axis Z extending in the vertical direction.

The first tower 220 may include a first discharge guide 225 to guide the air inside the first distribution space 220*s* to the first discharge port 222. The first tower 220 may be symmetrical with the second tower 230 with respect to the blowing space S, and may have the same shape and structure as the second tower 230. The description of the first tower 220 described above may be identically applied to the second tower 230.

Figure 4:
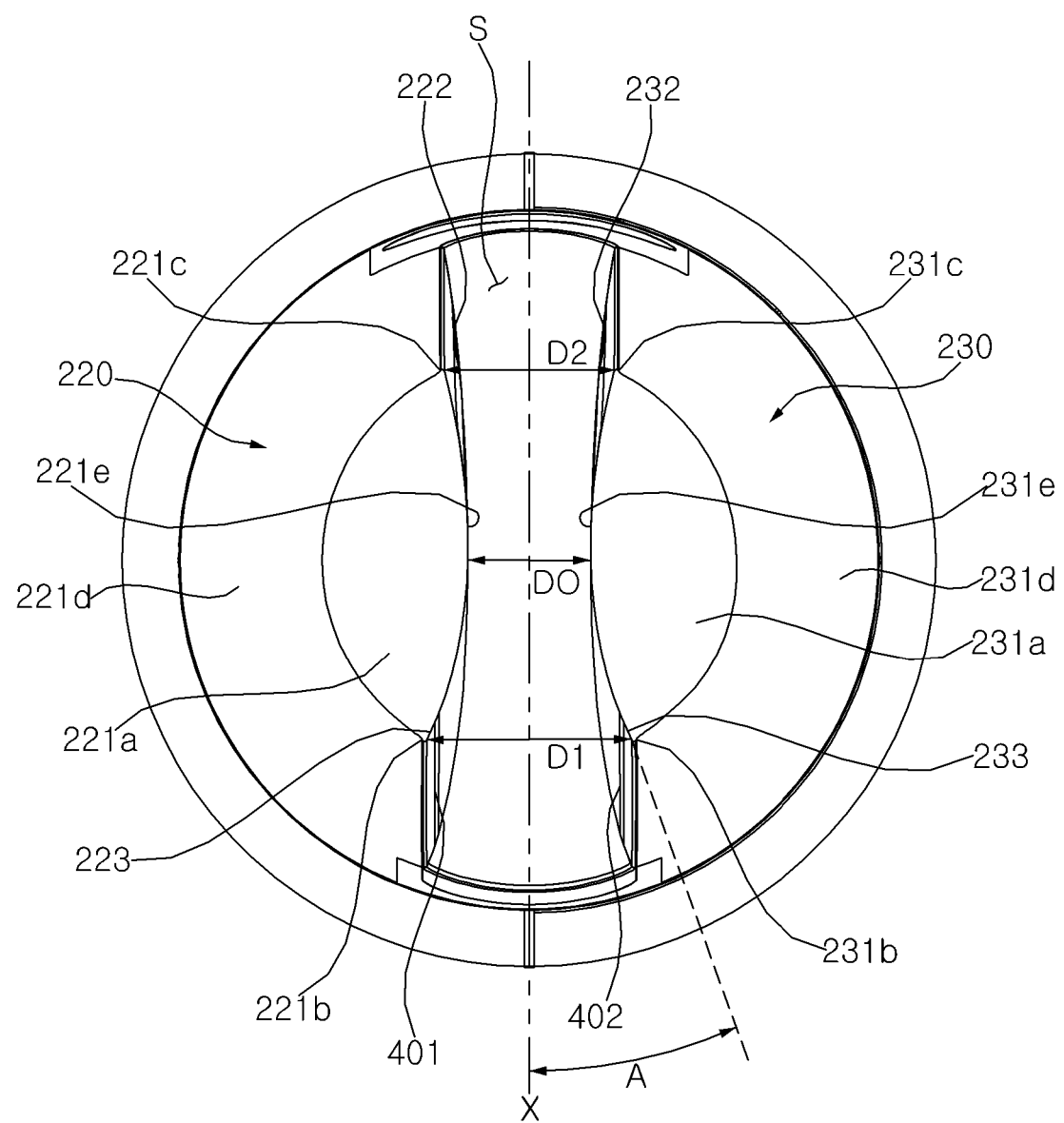
FIG. 4 is a top view of a blower according to an embodiment.
Figure 5:
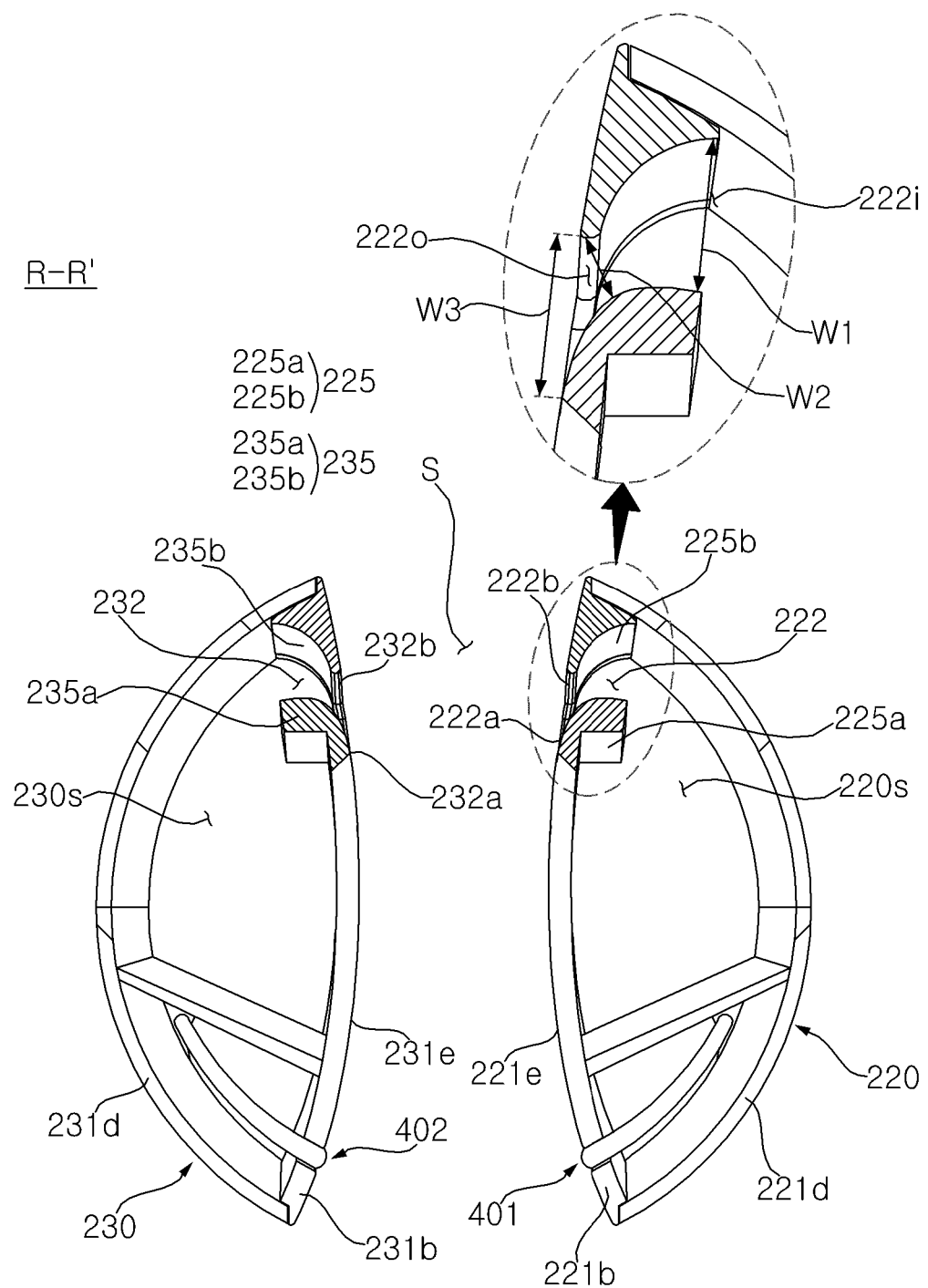
FIG. 5 is a horizontal cross-sectional perspective view of the blower shown in FIG. 1 on a R-R' line.

Hereinafter, an air discharge structure of the blower 1 for inducing a Coanda effect will be described with reference to FIGS. 4 and 5. FIG. 4 shows a form in which the blower 1 is viewed from the top to the bottom, and FIG. 5 shows a form in which the blower 1 is cut along the R-R' diagram shown in FIG. 1 and viewed upward.

Referring to FIG. 4, due to the convex curvatures of the first and second inner walls 221*e* and 231, a distance between the first inner wall 221e and the second inner wall 231e may decrease while approaching a closer of the blowing space S.

The first inner wall 221e and the second inner wall 231e may be formed to be convex toward the radial inner side, and a shortest or center distance D0 may be formed between the vertices or centers of the first inner wall 221e and the second inner wall 231e. The shortest distance D0 may be formed in the center of the blowing space S.

The first and second discharge ports 222 and 232 may be formed behind a position where the shortest distance D0 is formed. The first tower front end 221b and the second tower front end 231b may be spaced apart by a first or front distance D1. The first tower rear end 221c and the second tower rear end 231c may be spaced apart by a second or rear distance D2.

The first distance D1 and the second distance D2 may be the same, but embodiments disclosed herein are not limited. The first distance D1 may be greater than the shortest distance D0, and the second distance D2 may be greater than the shortest distance D0.

The distance between the first inner wall 221e and the second inner wall 231e may be decreased from the rear ends 221c, 231c to a position where the shortest distance D0 is formed, and may be increased from a position where the shortest distance D0 is formed to the front ends 221b, 231b.

The first tower front end 221b and the second tower front end 231b may be formed to be inclined or curved with respect to a front-rear axis X. Tangent lines drawn at each of the first and second tower front ends 221b and 231b may have a certain inclination angle A with respect to the front-rear axis X. Some of the air discharged forward through the blowing space S may flow with the inclination angle A with respect to the front-rear axis X. Due to this curved structure of the first and second inner walls 221e and 231e, the diffusion angle of the air discharged forward through the blowing space S may be increased.

A first airflow converter 401 described later may be brought into the first board slit 223 when air is discharged forward through the blowing space S. A second airflow converter 402 described later may be brought into the second board slit 233 when air is discharged forward through the blowing space S.

Referring to FIG. 5, air discharged toward the blowing space S may be guided in a flow direction by the first discharge guide 225 and the second discharge guide 235. The first discharge guide 225 may include a first inner guide 225a connected to the first inner wall 221e and a first outer guide 225b connected to the first outer wall 221d.

The first inner guide 225a may be manufactured integrally with the first inner wall 221e, or alternatively may be manufactured separately and later combined. The first outer guide 225b may be manufactured integrally with the first outer wall 221d, or alternatively may be manufactured separately and later combined.

The first inner guide 225a may be formed to protrude from the first inner wall 221e toward the first distribution space 220s. The first outer guide 225b may be formed to protrude from the first outer wall 221d toward the first distribution space 220s. The first outer guide 225b may be formed to be spaced apart from the first inner guide 225a and may form the first discharge port 222 between the first inner guide 225a and the first outer guide 225b. A radius of curvature of the first inner guide 225a may be less than a radius of curvature of the first outer guide 225b.

The air in the first distribution space 220s may flow between the first inner guide 225a and the first outer guide 225b, and may flow into the blowing space S through the first discharge port 222. The second discharge guide 235 may include a second inner guide 235a connected to the second inner wall 231e and a second outer guide 235b connected to the second outer wall 231d.

The second inner guide 235a may be manufactured integrally with the second inner wall 231e, or alternatively may be manufactured separately and later combined. The second outer guide 235b may be manufactured integrally with the second outer wall 231d, or alternatively may be manufactured separately and later combined.

The second inner guide 235a may be formed to protrude from the second inner wall 231e toward the second distribution space 230s. The second outer guide 235b may be formed to protrude from the second outer wall 231d toward the second distribution space 230s. The second outer guide 235b may be formed to be spaced apart from the second inner guide 235a and may form a second discharge port 232 between the second inner guide 235a and the second outer guide 235b.

A radius of curvature of the second inner guide 235a may be smaller than a radius of curvature of the second outer guide 235b. The air in the second distribution space 230s may flow between the second inner guide 235a and the second outer guide 235b and flow into the blowing space S through the second discharge port 232.

A width of the first discharge port 222 may be formed to gradually decrease and then increase as it progresses from an inlet of the first discharge guide 225, which may be an inlet 222i of the first discharge port 222, toward an outlet of the first discharge guide 226, which may be an outlet 222o of the first discharge port 222.

An inlet width w1 of the inlet 222i may be larger than an outlet width w3 of the outlet 222o. The inlet 222i of the first discharge port 222 may have an inlet width w1. The outlet 222o of the first discharge port 222 may have an outlet width w3. The inlet 222i of the first discharge port 222 may be located behind the outlet 222o. The air introduced into the first discharge port 222 may flow forward as it goes from the inlet 222i to the outlet 222o.

The inlet width w1 may be defined as a distance between an outer end of the first inner guide 225a and an outer end of the first outer guide 225b. The outlet width w3 may be defined as a distance between the first discharge port front end 222a, which is an inner end of the first inner guide 225a, and the first discharge port rear end 222b, which is an inner end of the first outer guide 225b.

The inlet width w1 and the outlet width w3 may each be larger than a shortest or inner width w2 of the first discharge port 222. The shortest width w2 may be defined as the shortest distance between the first discharge port rear end 222b and the first inner guide 225a. The width of the first discharge port 222 may gradually decrease from the inlet of the first discharge guide 225 to a position where the shortest width w2 is formed, and may gradually increase from a position where the shortest width w2 is formed to the outlet of the first discharge guide 225.

Similar to the first discharge guide 225, the second discharge guide 235 may have a second discharge port front end 232a and a second discharge port rear end 232b. The second discharge guide 235 may have a same width distribution or configuration as the first discharge guide 225.

The air discharged to the blowing space S through the first discharge port 222 may flow forward along an inner surface of the first inner wall 221e due to the Coanda effect. The air discharged to the blowing space S through the second discharge port 232 may flow forward along an inner surface of the second inner wall 231e due to the Coanda effect.

Figure 6:
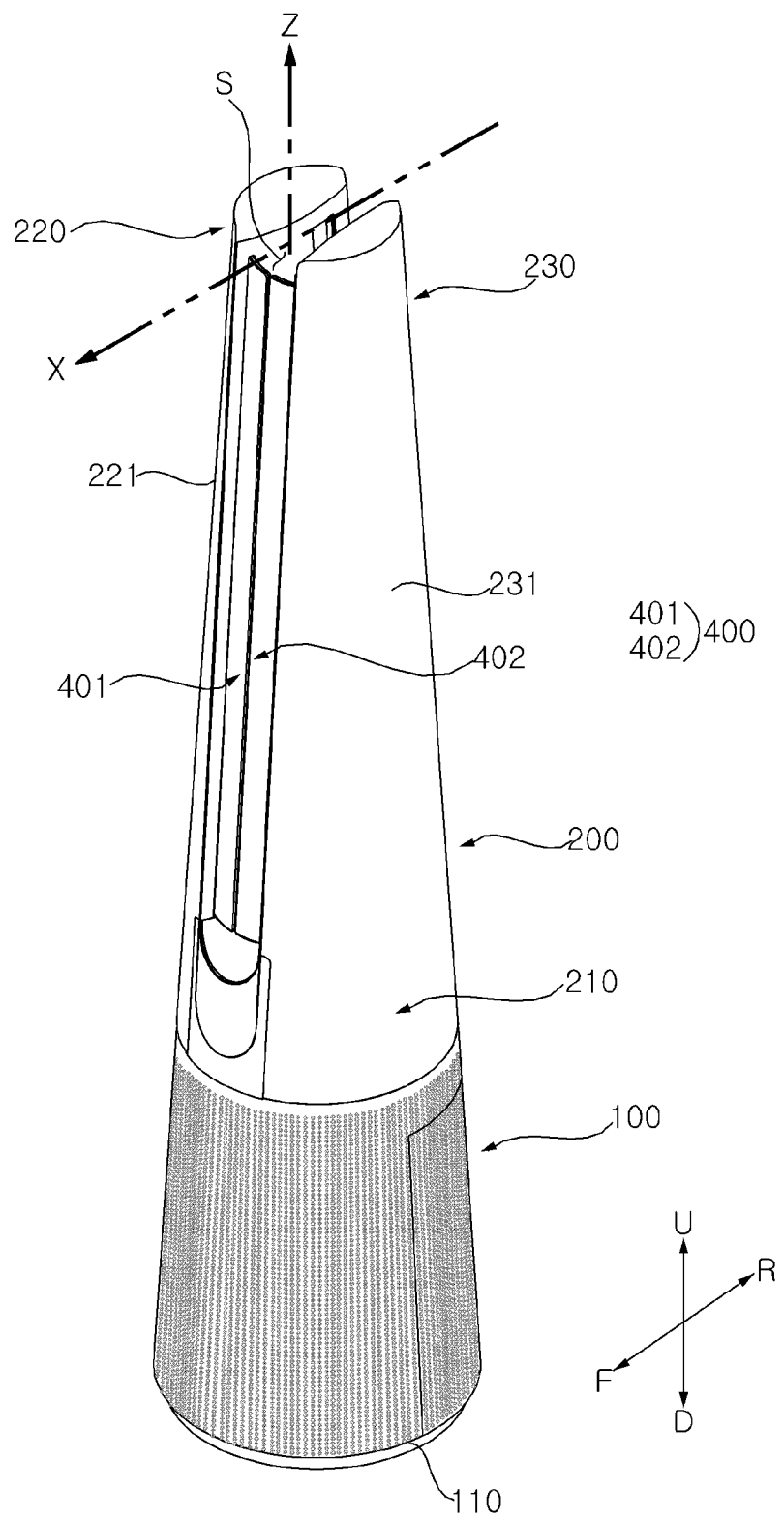
FIG. 6 is an exemplary view of an airflow converter according to an embodiment.
Figure 7:
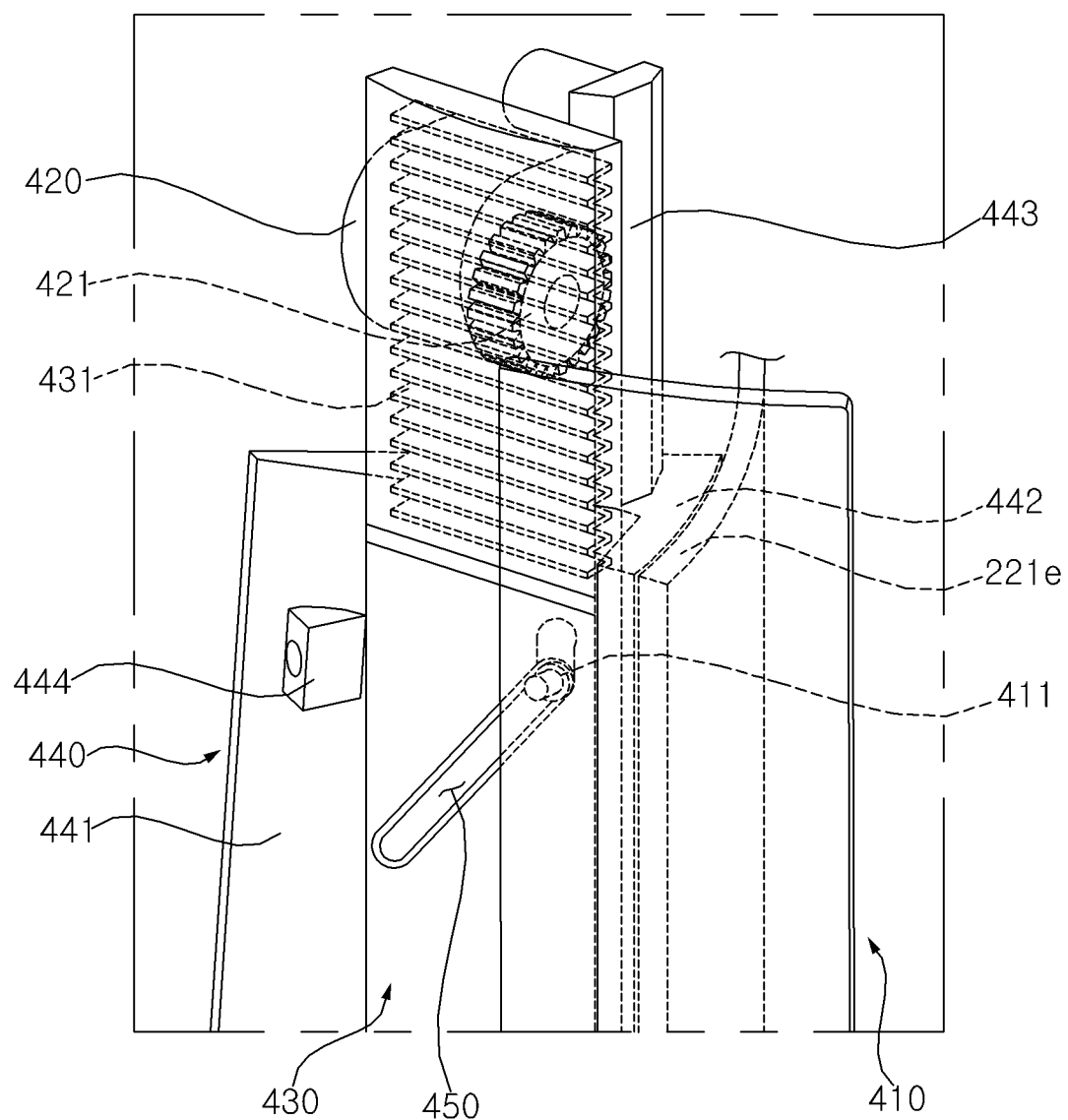
FIG. 7 is a structural diagram of an airflow converter according to an embodiment.

Hereinafter, a wind direction change by an air flow converter 400 will be described with reference to FIGS. 6 and 7. FIG. 6 is a diagram illustrating a form in which the airflow converter 400 protrudes into the blowing space S so that the blower 1 forms an upward airflow, and FIG. 7 is a diagram illustrating the operating principle of the airflow converter 400.

Referring to FIG. 6, the airflow converter 400 may protrude toward the blowing space S and may convert the flow of air discharged forward through the blowing space S into a rising wind. The airflow converter 400 may include a first airflow converter 401 provided at the first tower case 221 and a second airflow converter 402 provided at the second tower case 231.

The first airflow converter 401 and the second airflow converter 402 be coupled to (e.g., inserted in) and protrude from each of the first tower 220 and the second tower 230 toward the blowing space S to block a front of the blowing space S. When the first airflow converter 401 and the second airflow converter 402 protrude to block the front of the blowing space S, the air discharged through the first discharge port 222 and the second discharge port 232 may flow upward in the Z direction.

The first and second airflow converters 401 and 402 may be configured be inserted or pulled to an inside of the first and second towers 220 and 230, respectively, via the first and second board slits 223 and 233. When the first airflow converter 401 and the second airflow converter 402 are respectively brought or pulled into the first tower 220 and the second tower 230 to open the front of the blowing space S, the air discharged through the first discharge port 222 and the second discharge port 232 may flow forward X through the blowing space S. As an alternative, the first and second airflow converts 401 and 402 may be configured to be removable from the first and second board slits 223 and 233 (e.g., by lifting or pulling). As another alternative, the first and second air flow converters 401 and 402 may be removably coupled to the inner walls 221e and 231e of the first and second tower cases 221 and 231.

Referring to FIG. 7, the first and second airflow converters 401 and 402 may each include a board 410 protruding toward the blowing space S, a motor 420 providing driving force to the board 410 to move the board 410, a board guide 430 to guide a moving direction of the board 410, and a cover 440 to support the motor 410 and the board guide 430. Hereinafter, the first airflow converter 401 will be described as an example, but the description of the first airflow converter 401 described below may be identically applied to the second airflow converter 402.

The board 410 may be brought into the first board slit 223 as shown in FIGS. 4 and 5. When the motor 420 is driven, the board 410 may protrude into the blowing space S through the first board slit 223. The board 410 may be curved to have an arc shape. When the motor 420 is driven, the board 410 may be moved in a curved or circumferential direction to protrude into the blowing space S.

The motor 420 may be connected to a pinion gear 421 to rotate the pinion gear 421. The motor 420 may rotate the pinion gear 421 clockwise or counterclockwise.

The board guide 430 may have a plate shape extending vertically. The board guide 430 may include a guide slit 450 which is inclined upward in a rightward direction (or alternatively, leftward direction), based on FIG. 7. The board guide may include a rack 431 formed to protrude toward and engage with the pinion gear 421.

When the motor 420 is driven and the pinion gear 421 is rotated, the rack 431 engaged with the pinion gear 421 may be moved vertically. A guide protrusion or knob 411 may be formed in the board 410 to protrude toward the board guide 430. The guide protrusion 411 may be inserted into the guide slit 450.

When the board guide 430 is moved vertically according to the vertical movement of the rack 431, the guide protrusion 411 may be moved by an edge of the board guide 430 defining the guide slit 450 pressing against the guide protrusion 411. According to the vertical movement of the board guide 430, the guide protrusion 411 may be moved diagonally within the guide slit 450.

When the rack 431 is moved upward, the guide protrusion 411 may be moved along the guide slit 450 to be positioned in a lowermost end (also a leftmost end in FIG. 7) of the guide slit 450. When the guide protrusion 411 is positioned in the lowermost end of the guide slit 450, the board 410 may be completely concealed within the first tower 220 as shown in FIGS. 4 and 5. When the rack 431 is moved upward, the guide slit 450 is also moved upward. Accordingly, the guide protrusion 411 may be moved in the circumferential direction on a same horizontal plane along the guide slit 450.

When the rack 431 is moved downward, the guide protrusion 411 may be moved along the guide slit 450 to be positioned in an uppermost end (also a rightmost end in FIG. 7) of the guide slit 450. When the guide protrusion 411 is positioned in the uppermost end of the guide slit 450, the board 410 may protrude from the first tower 220 toward the blowing space S as shown in FIG. 6. When the rack 431 is moved downward, the guide slit 450 is also moved downward. Accordingly, the guide protrusion 411 may be moved in the circumferential direction on the same horizontal plane along the guide slit 450.

The cover 440 may include a first cover 441 provided outside the board guide 430, a second cover 442 provided inside the board guide 430 and contacting the first inner surface 221e, a motor support plate 443 extended upward from the first cover 441 and connected to the motor 420, and a stopper 444 to limit the vertical movement of the board guide 430.

The first cover 441 may cover an outside of the board guide 430, and the second cover 442 may cover an inside of the board guide 430. The first cover 441 may separate a space in which the board guide 430 is provided from the first distribution space 220s. The second cover 442 may prevent the board guide 430 from contacting the first inner wall 221e. The motor support plate 443 may extend upward from the first cover 441 to support the load of the motor 420.

The stopper 444 may be formed to protrude toward the board guide 430 from the first cover 441. A locking protrusion may be formed on a surface of the board guide 430, and the locking protrusion may be configured to be caught by the stopper 444 according to the vertical movement of the board guide 430. When the board guide 430 is moved vertically, the locking protrusion may be caught by the stopper 444 so that a vertical movement of the board guide 430 may be restricted.

Figure 8:
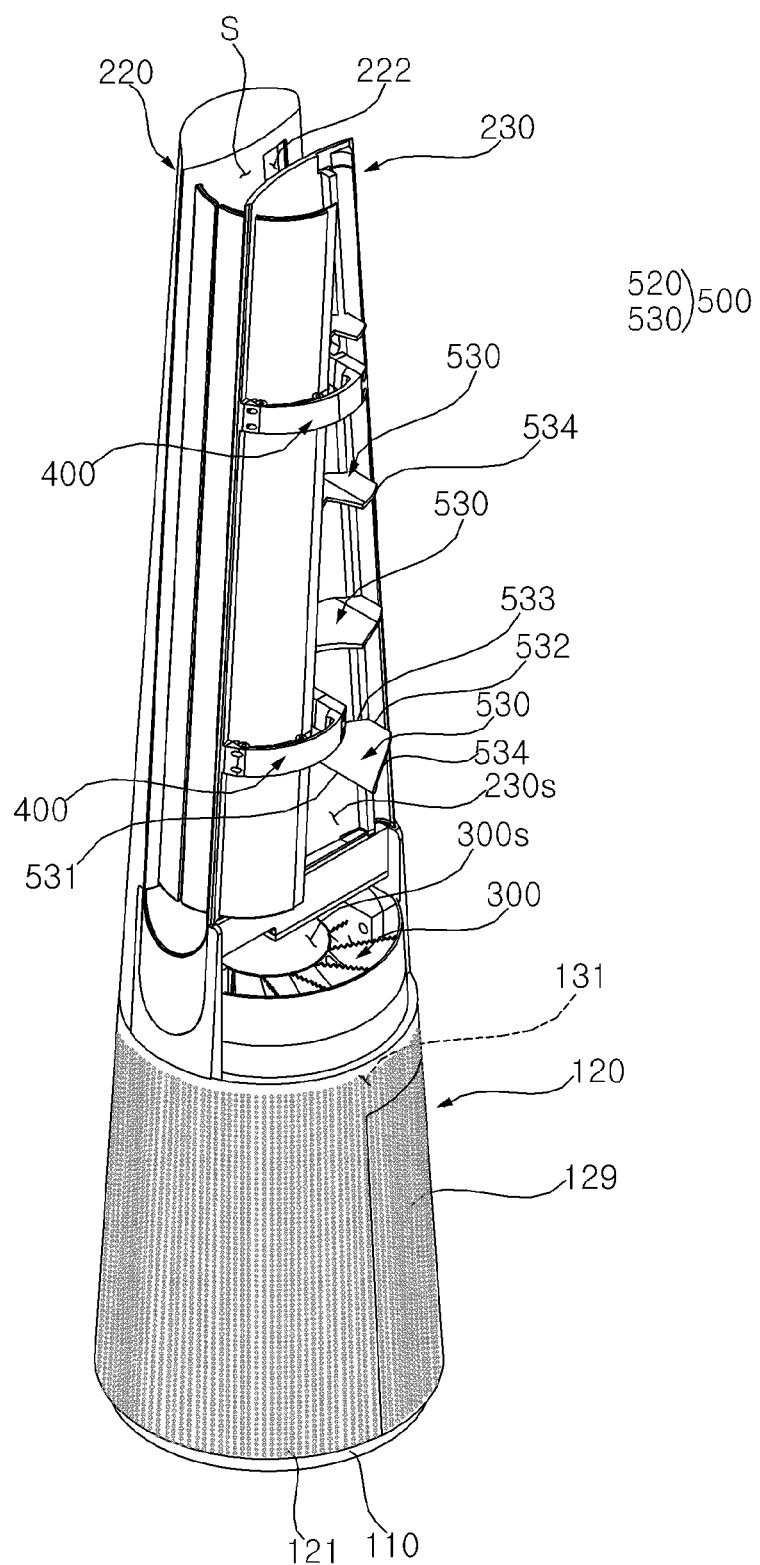
FIG. 8 is a cut-away view of a part of a blower according to a first embodiment.

Hereinafter, an arrangement of the flow guide 500 will be described with reference to FIG. 8. Referring to FIG. 8, the flow guide 500 may include a first flow guide 520 provided at the first tower 220 and a second flow guide 530 provided at the second tower 230. The first flow guide 520 and the second flow guide 530 may have a same or similar structure and may be symmetrical with respect to the blowing space S. The description of the second flow guide 530 described below may be equally applied to that of the first flow guide 520.

The fan assembly 300 may introduce air outside the blower 1 into the lower case 120 through the suction hole 121. Air introduced into the lower case 120 may flow into the pressurized space 300s through the filter hole 131. The lower case 120 may include a case door 129, and the case door 129 may be detachable from the lower case 120. When the case door 129 is separated from the lower case 120, the filter 130 may be placed in a state capable of being withdrawn from the inside of the case.

Air introduced into the pressurized space 300s by the fan assembly 300 may flow into the second tower 230 through the second distribution space 230s. Air introduced into the second tower 230 may flow upward, and a flow direction may be guided by the second flow guide 530.

The second flow guide 530 may be provided above the fan assembly 300 and may be provided inside the second distribution space 230s. The plurality of second flow guides 530 may be spaced vertically from each other. The number of second flow guides 530 is not limited, but as an example, four second flow guides 530 may be provided.

The second flow guide 530 may extend in a horizontal direction from the rear end of the second tower 231c toward the front end of the second tower 231b. A guide rear end 532 of the second flow guide 530 may be connected to the rear end of the second tower 231c. A guide front end 531 of the second flow guide 530 may be spaced apart from a rear of the front end of the second tower 231b.

The second flow guide 530 may have a curved plate shape extending in a horizontal direction between the second inner wall 231e and the second outer wall 231d. A guide inner end 533 of the second flow guide 530 may be in close contact with or connected to the second inner wall 231e. A guide outer end 534 of the second flow guide 530 may be in close contact with or connected to the second outer wall 231d.

Hereinafter, the structure of the flow guide 500 will be described in detail with reference to FIG. 9. For convenience of explanation, the second flow guide 530 is described as an example, but the description of the second flow guide 530 may be applied equally to the first flow guide 520.

Figure 9:
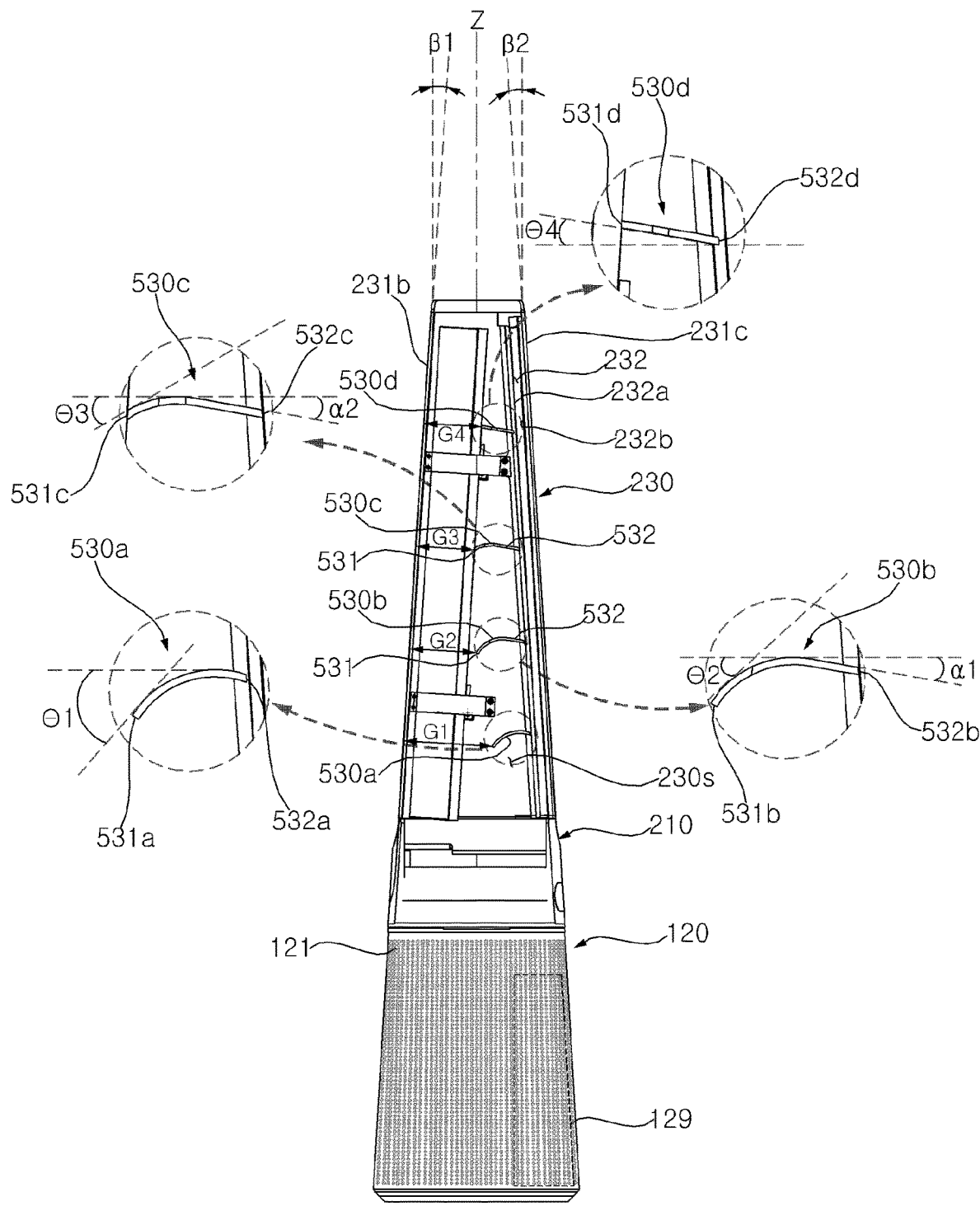
FIG. 9 is a side perspective view of the blower shown in FIG. 8.

Referring to FIG. 9, the second flow guide 530 may be provided closer to the rear end of the second tower 231c than the front end of the second tower 231b. The guide front end 531 may be spaced apart from the rear of the second tower front end 231b, and the guide rear end 532 may be spaced apart from the front of the second tower rear end 231c.

The second flow guide 530 may be fixed to the second tower case 231 by coupling the guide rear end 532 to the rear end of the second tower 231c. The guide inner end 533 and the guide outer end 534 may be coupled to the second inner wall 231e and the second outer wall 231d, respectively, so that the second flow guide 530 may be fixed to the second tower case 231.

A plurality of flow guides 500 may be arranged to be spaced apart in the vertical direction. The flow guides 500, 520, 530 may include a first guide 530a, a second guide 530b provided above the first guide 530a, a third guide 530c provided above the second guide 530b, and a fourth guide 530d provided above the third guide 530c.

The first guide 530a may mean a flow guide 500 (530 in this example) provided at the bottom of the plurality of flow guides 500 (530). A lower surface of the first guide 530a may face the fan assembly 300, and an upper surface of the first guide 530a may face a lower surface of the second guide 530b.

The second guide 530b may mean be provided adjacent to the first guide 530a =. A lower surface of the second guide 530b may face an upper surface of the first guide 530a, and an upper surface of the second guide 530b may face a lower surface of the third guide 530c.

The third guide 530c may be adjacent to the fourth guide 530d. A lower surface of the third guide 530c may face an upper surface of the second guide 530b, and an upper surface of the third guide 530c may face a lower surface of the fourth guide 530d.

The fourth guide 530d may mean a flow guide 500 (530) provided at a top of the plurality of flow guides 500 (530). A lower surface of the fourth guide 530d may face an upper surface of the third guide 530c, and an upper surface of the fourth guide 530d may face the upper end of the second tower 231a.

The second guide 530b and the third guide 530c may be between the first guide 530a and the fourth guide 530d. The second flow guides 530 may be formed to be curved. Some of the plurality of second flow guides 530 may be formed to be convex upward. Some of the plurality of second flow guides 530 may be inclined upward, some may be formed in a flat plate shape, and some may be formed to be bent downward.

The first guide 530a may be formed to be bent downward in a forward direction. The guide front end 531a of the first guide 530a may be positioned below the guide rear end 532a. The first guide 530a may extend horizontally from the rear end of the tower 231c toward a front side and may bend downward toward the front side. A tangent line at the guide front end 531a of the first guide 530a may have an inclination angle $\theta 1$ downward with respect to the horizontal direction.

The second guide 530b may be formed to be convex upward. The second guide 530b may be curved forward from the rear end of the tower 231c and may have a shape that is convex upward. The guide front end 531b of the second guide 530b may be positioned below the guide rear end 532b. A tangent line at the guide front end 531b of the second guide 530b may have an inclination angle $\theta 2$ downward with respect to the horizontal direction. The tangent line at the rear guide end 532b of the second guide 530b may have an inclination angle $\alpha 1$ downward with respect to the horizontal direction.

The third guide 530c may be formed to be convex upward. The third guide 530c may be curved forward from the rear end of the tower 231c and may have a shape that is convex upward. The guide front end 531c of the third guide 530c may be positioned above the guide rear end 532c. A tangent line at the guide front end 531c of the third guide 530c may have an inclination angle $\theta 3$ downward with respect to the horizontal direction. A tangent line at the guide rear end 532c of the third guide 530c may have an inclination angle $\alpha 2$ downward with respect to the horizontal direction.

The fourth guide 530d may extend obliquely upward. The fourth guide 530d may extend toward the front side from the rear end of the tower 231c and may have a flat plate shape. The guide front end 531d of the fourth guide 530d may be positioned above the guide rear end 532d. An upper and a lower surface of the fourth guide 530d may have an upward inclination angle $\theta 4$ with respect to the horizontal direction. The inclination angle $\theta 4$ of the fourth guide 530d may be kept constant in the front-rear direction.

A distance between each of the plurality of flow guides 530a, 530b, 530c, and 530d and the front end of the tower 231b may be formed to be different from each other. The first guide 530a may be spaced apart from the front end of the tower 231b by a first gap G1. The second guide 530b may be spaced apart from the front end of the tower 231b by a second gap G2. The third guide 530c may be spaced apart from the front end of the tower 231b by a third gap G3. The fourth guide 530d may be spaced apart from the front end of the tower 231b by a fourth gap G4.

The gaps G1, G2, G3, and G4 between the plurality of second flow guides 530 and the front end of the tower 231b may become wider (i.e., longer in an approximately horizontal direction from an inner surface of the second tower 230 and the flow guide 530) in a downward direction. The first gap G1 may be wider than the second gap G2, the second gap G2 may be wider than the third gap G3, and the third gap G3 is greater than the fourth gap G4.

The front end of the second tower 231b may extend obliquely with respect to the vertical direction. The front end of the second tower 231b may be obliquely extended rearward in an upward direction. The front end of the second tower 231b may be closer to a vertical axis Z located at a center in the upward direction. The front end of the second tower 231b may have an inclination angle β1 to the rear with respect to the vertical direction.

The rear end of the second tower 231c may extend obliquely with respect to the vertical direction. The rear end of the second tower 231c may be obliquely extended forward in the upward direction. The rear end of the second tower 231c may be closer to the vertical axis Z located at a center in an upward direction. The rear end of the second tower 231c may have a forward inclination angle β2 with respect to the vertical direction.

The second discharge port 232 may extend obliquely with respect to the vertical direction. The second discharge port 232 may be obliquely extended forward in an upward direction. The second discharge port 232 may be closer to the vertical axis Z located at the center in an upward direction. The second discharge port 232 may extend parallel to the rear end of the second tower 231c. The front end of the second discharge port 232a and the rear end of the second discharge port 232b may extend in a parallel direction.

The front end of the tower 231b, the rear end of the tower 231c, and the discharge port 232 may be formed to be inclined, and the gaps G1, G2, G3 and G4 between the second flow guide 530 and the front end of the tower 231b become narrower toward an upper side. Therefore, the air blown by the fan 320 may be smoothly guided to the discharge port 232 by the flow guide 500. In addition, because the front end of the tower 231b, the rear end of the tower 231c and the discharge port 232 are formed to be inclined, and the gaps G1, G2, G3 and G4 between the second flow guides 530 and the front end of the tower 231b become narrower toward the upper side, the air discharged through the discharge port 232 may be evenly distributed in a vertical direction.

The air blown by the fan 320 may have a higher pressure at a position closer to the fan 320 and a lower pressure as it flows further away from the fan 320. By forming a wide gap between the flow guide 530 located close to the fan 320 (first guide 530a) and the front end of the tower 231b, more air is diffused upward to prevent a phenomenon where air discharged through the discharge port is concentrated at a lower side. By forming a narrow gap between the flow guide 500 located far from the fan 320 and the front end of the tower 231b, air having a reduced flow rate while flowing upward may not be separated and is instead guided to the discharge port by the flow guide 500.

Figure 10:
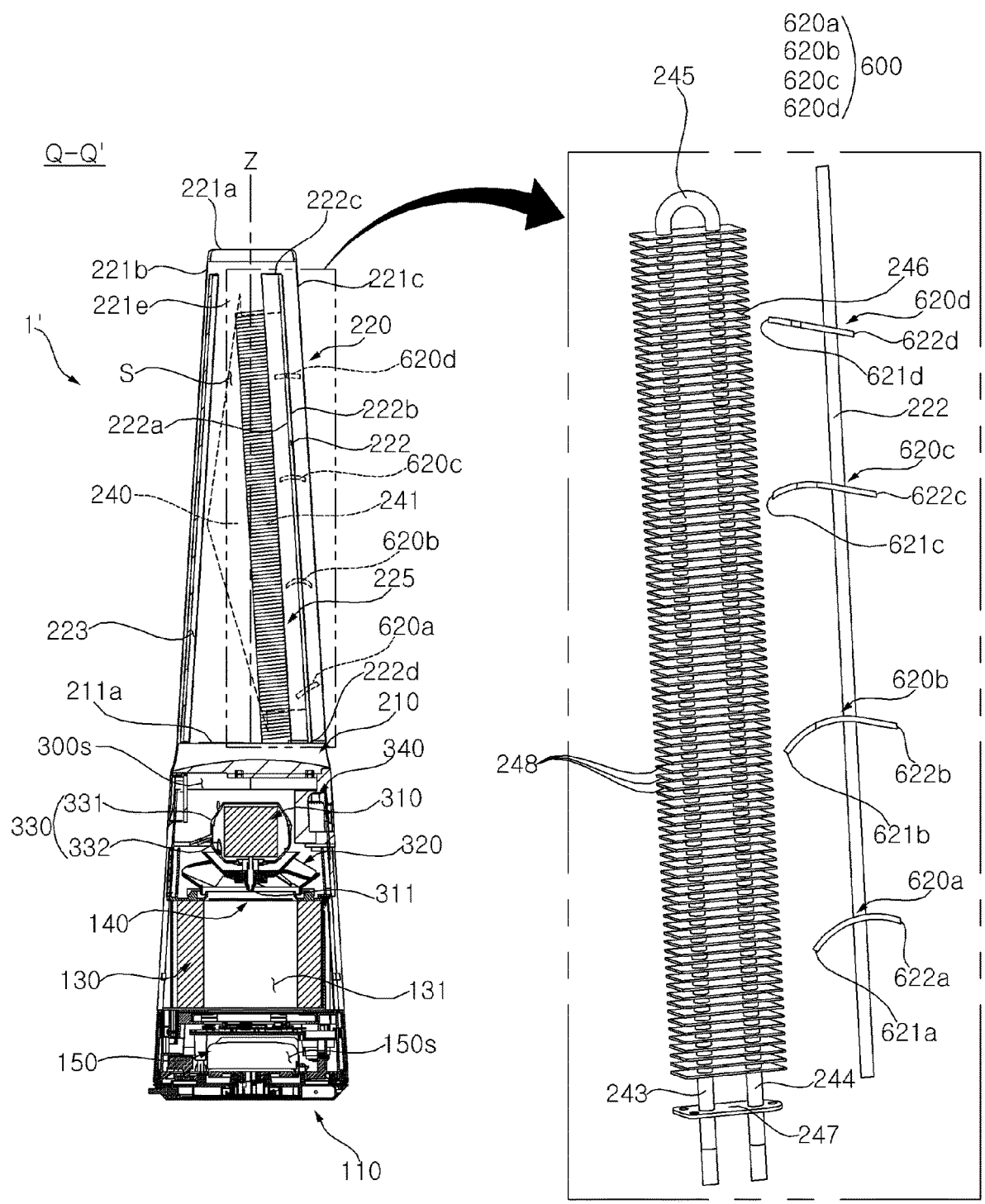
FIG. 10 is a longitudinal sectional perspective view of a blower according to another embodiment.

Hereinafter, a structure of a flow guide 600 in a blower 1' according to another embodiment will be described with reference to FIG. 10. Referring to FIG. 10, In the blower 1' according to another embodiment, the heater 240 may be provided inside the upper cases 221 and 231. The heater 240 may be provided inside the first tower 220 and the second tower 230, respectively. A first heater 241 may be provided inside the first tower 220, and a second heater may be provided inside the second tower 230. A structure and arrangement of the heater 240 may be described by taking the first heater 241 as an example, but the description of the first heater 241 is equally applied to the second heater of the second tower 230.

A flow guide 600 may be provided inside the blower 1'. A plurality of flow guides 600 may be arranged to be spaced apart in a vertical direction. The flow guides 600 may include a first guide 620a, a second guide 620b, a third guide 620c, and a fourth guide 620d, and a shape and structure of the flow guide 600 may be the same as or similar to the flow guide 500 according to the previously described embodiment.

The heater 240 may include a first heat dissipation tube 243 extending in a vertical direction, a second heat dissipation tube 244 extending in a vertical direction and spaced apart from the first heat dissipation tube 243, a corner 245 connecting the first heat dissipation tube 243 and the second heat dissipation tube 244, a holder 247 fixing the first heat dissipation tube 243 and the second heat dissipation tube 244, and a plurality of radiating fins 248 through which the first heat dissipation tube 243 and the second heat dissipation tube 244 pass. The first heat dissipation tube 243, the second heat dissipation tube 244, and the corner 245 may be integral pipes, and may be fixed by the holder 247.

The plurality of radiating fins 248 may extend in a front-rear direction. The plurality of radiating fins 248 may be spaced apart from each other in a vertical direction. A heating passage 246 through which air passes may be formed between the plurality of radiating fins 248. The heating passage 246 may be understood as an air flow passage extending in the front-rear direction between the plurality of radiating fins 248.

Each of the plurality of flow guides 600 may extend in the front-rear direction from the rear end of the tower 221c toward the front end of the tower 221b. The air passing through the heating passage 246 may be guided by the flow guide 600 and discharged to the blowing space S through the discharge port 222.

The flow guide 600 may be provided parallel to a flow direction of the air passing through the heating passage 246. The guide front ends 621a, 621b, 621c, 621d of the flow guide 600 may face the heating passage 246. The flow guide 600 may be extended in a streamlined form from the guide front end 621a, 621b, 621c and 621d to the guide rear end 622a, 622b, 622c and 622d in parallel with a flow direction of the air passing through the heating passage 246. The guide front ends 621a, 621b, 621c and 621d of the flow guide 600 may be spaced apart from the radiating fin 248.

Air blown by the fan 320 and introduced into the tower cases 221 and 231 may flow upward. The air flowing upward may flow backwards toward the discharge ports 222 and 232 while passing through the heating passage 246 formed between the radiating fins 248. The air that has passed through the heating passage 246 may be guided by the flow guide 600 and discharged to the blowing space S through the discharge ports 222 and 232. The air that is introduced into the towers 220 and 230 and flowing upward may be smoothly discharged to the discharge ports 222 and 232 by being guided by the heater 240 and flow guide 600.

Figure 11:
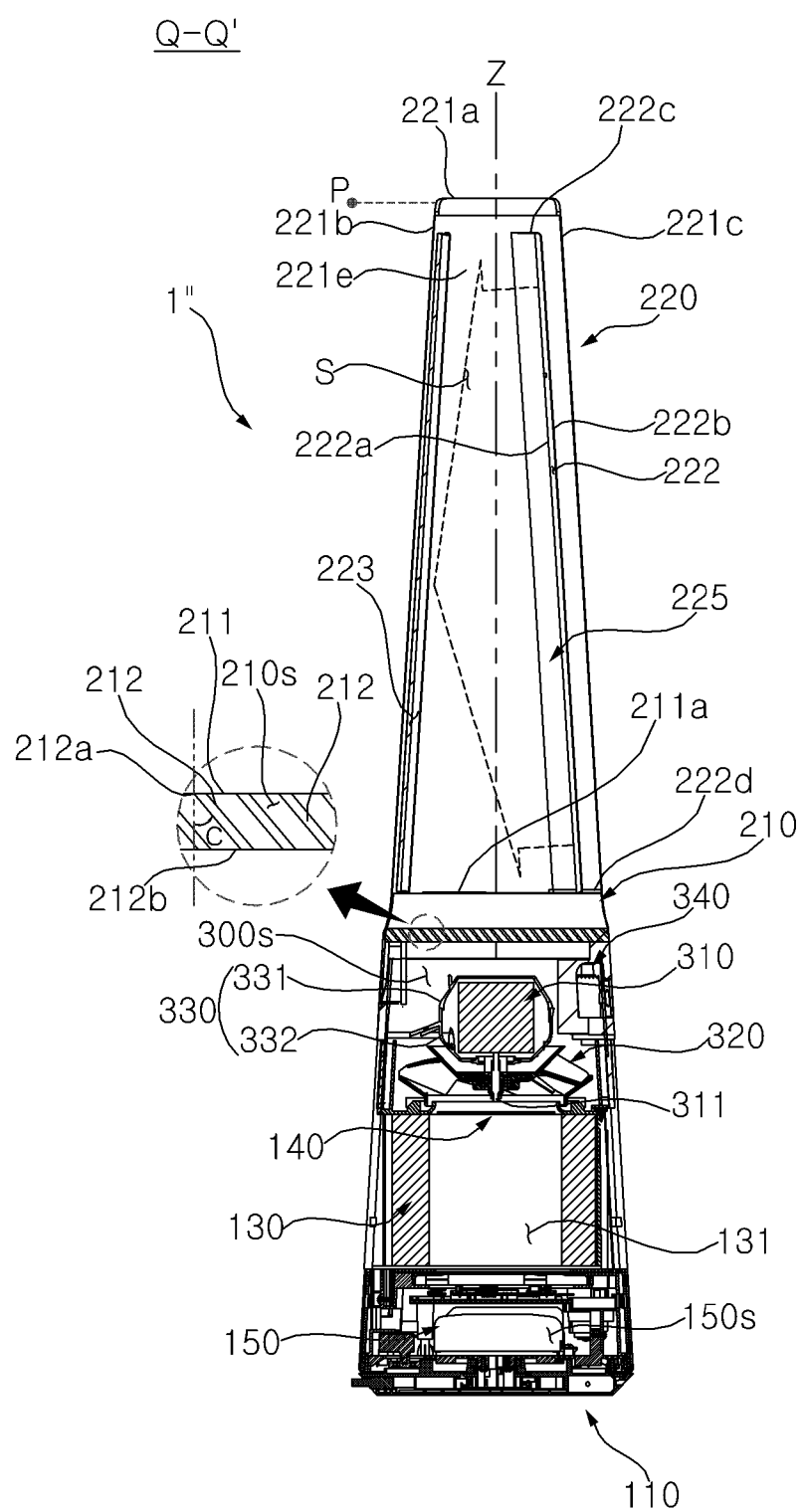
FIG. 11 is a longitudinal sectional perspective view of a blower according to yet another embodiment.
Figure 12:
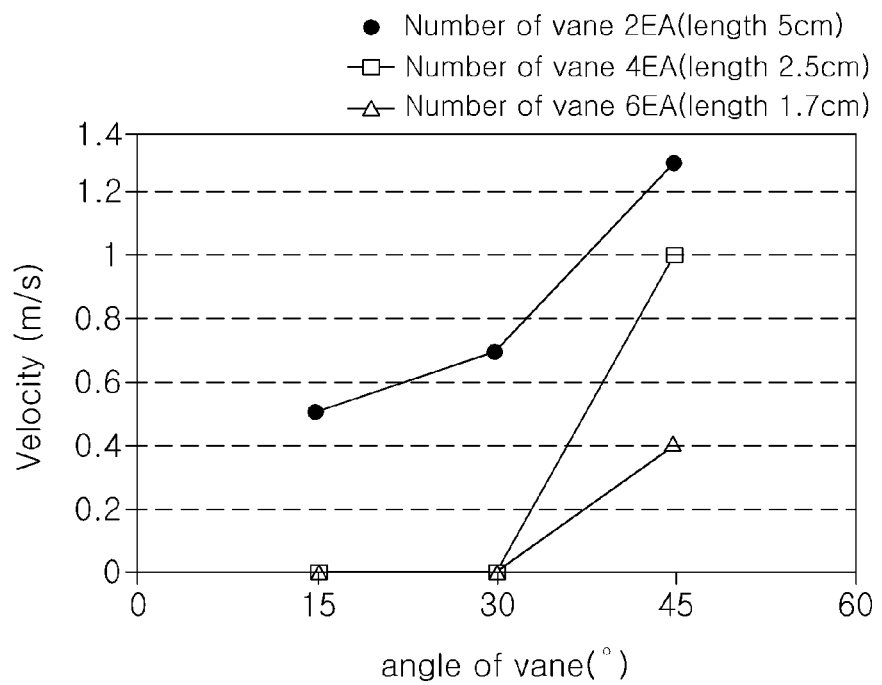
FIG. 12 is a graph showing the effect of the blower of FIG. 11.
Figure 13:
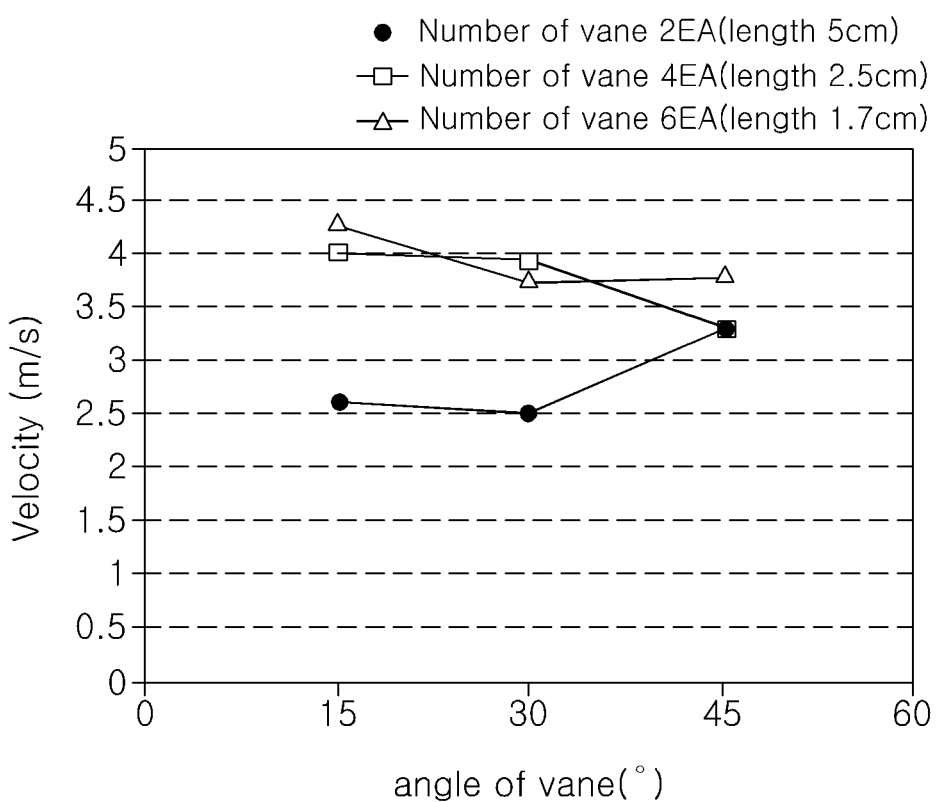
FIG. 13 is a graph showing the effect of the blower of FIG. 11.

Hereinafter, a structure of a flow guide 212 of a blower 1" according to another embodiment and an effect thereof will be described with reference to FIGS. 11 to 13. FIG. 11 is a longitudinal sectional perspective view of a blower 1" according to another embodiment of the present invention, and FIGS. 12 and 13 are graphs showing the effect of the flow guide 212.

Referring to FIG. 11, a third discharge port 210s opened in a vertical direction may be formed on the top surface 211 of the tower base 210. A flow guide 212 configured to guide air may be provided in the third discharge port 210s. The third discharge port 210s may be formed at a concave portion of the top surface 211 of the tower base 210.

The flow guide 212 may be provided to be inclined with respect to the vertical direction. The guide upper end 212a of the flow guide 212 may be located at a horizontal side of the guide lower end 212b. The flow guide 212 may be connected to the tower base 210.

A plurality of flow guides 212 may be arranged to be spaced apart in a front-rear direction. A plurality of third discharge ports 210s may be formed between the plurality of flow guides 212, respectively.

The flow guide 212 may be provided between the first tower 220 and the second tower 230, and may be provided under the blowing space S. The air blown from the fan 320 may be guided by the flow guide 212 and discharged to the blowing space S through the third discharge port 210s.

The structure of the third discharge port 210s and the flow guide 212 according to the embodiment described above may be applicable to the blower 1 and the blower 1' according to previously described embodiments. In this case, the flow guide 212 may be referred to as a guide vane 212. The slope of the flow guide 212 with respect to the vertical direction is defined as the flow guide angle C.

FIG. 12 is a graph showing a measured value of a flow rate change according to the flow guide angle C measured at a point P 50 cm in front of the upper end of the tower 221a. The change in flow velocity according to the flow guide angle C was measured while changing the number of flow guides 212. When the number of flow guides 212 is 4 or more, if the flow guide angle C is less than 30 degrees, the flow velocity at the point P converges to zero. When the number of flow guides 212 is two, even if the flow guide angle C is reduced, air flow from the point P to the front is formed.

FIG. 13 is a graph showing the measured value of the airflow at an upper side of the tower 220. When the number of flow guides 212 is 2, 4, and 6, airflow is formed above the tower 221. In addition, when the number of flow guides 212 is 4 or 6, flow velocity decreases as the flow guide angle C increases. Referring to FIGS. 12 and 13, when at least four flow guides 212 are provided, flow in a forward direction may be reduced or minimized, and an upward air flow may be formed.

This application is related to co-pending U.S. application Ser. No. 17/190,692 filed Mar. 3, 2021, U.S. application Ser. No. 17/191,873 filed Mar. 4, 2021, U.S. application Ser. No. 17/197,918 filed Mar. 10, 2021, U.S. application Ser. No. 17/318,222 filed May 12, 2021, U.S. application Ser. No. 17/318,242 filed May 12, 2021, U.S. application Ser. No. 17/318,274 filed May 12, 2021, U.S. application Ser. No. 17/335,810 filed Jun. 1, 2021, U.S. application Ser. No. 17/335,856 filed Jun. 1, 2021, U.S. application Ser. No. 17/336,517 filed Jun. 2, 2021, and U.S. application Ser. No. 17/335,902 filed Jun. 1, 2021, whose entire disclosures are incorporated by reference herein.

Embodiments disclosed herein may guide air blown upward by a fan to a discharge port via a flow guide so that air is evenly distributed in a vertical direction through the discharge port. By adjusting a distance between the flow guide and an upper case, the flow rate may be evenly distributed according to a distance spaced from the fan. A flow resistance and noise may be reduced by making a shape of the plurality of flow guides different according to an arrangement position.

Embodiments disclosed herein may provide a blower that evenly supplies clean air in the vertical direction. The blower may have a simplified air guide structure. A flow resistance generated by the guide may be reduced or minimized. Noise generated by a guide may be reduced.

Embodiments disclosed herein may be implemented as a blower including a lower case having a suction port, a fan provided in the lower case, an upper case provided above the lower case and having a space through which air blown from the fan flows, and a discharge port formed to extend through the upper case. The blower may include a flow guide provided in the space and extending in a direction crossing the longitudinal direction of the discharge port, and air flowing upward may be guided toward the discharge port by the flow guide.

A plurality of flow guides may be arranged. The plurality of flow guides may be spaced apart from each other in the longitudinal direction of the discharge port.

The plurality of flow guides may be aligned with each other in the longitudinal direction of the discharge port. The discharge port may be formed long along a rear end of the upper case.

The flow guide may extend from a rear end of the upper case toward a front end of the upper case. The flow guide may be spaced apart from the front end of the upper case, and a gap may be formed between the flow guide and the front end of the upper case.

A distance formed by the flow guide provided at a lower side may be larger than a distance formed by the flow guide provided at an upper side. The flow guide may include a guide front end facing the front end of the upper case and forming the gap. The front end of the upper case may be inclined so as to approach the flow guide and the rear end of the upper case in the upward direction.

The discharge port may extend obliquely forward in the upward direction. The front end of the upper case may be inclined so as to be closer to the flow guide and the discharge port in the upward direction. The plurality of flow guides may include a first guide that is provided closest to the fan and extends to be bent downward in the forward direction.

The plurality of flow guides may include a fourth guide provided farthest from the fan and extending obliquely upward as it goes forward. The fourth guide may be a flat plate.

The plurality of flow guides may include a guide front end facing the front end of the upper case and a guide rear end connected to the rear end of the upper case. The plurality of flow guides may include a second guide that extends convexly upward and has the guide rear end higher than the guide front end. The plurality of flow guides may include a third guide positioned higher than the second guide, extending convexly upward, and having the guide rear end lower than the guide front end.

The blower may further include a heater provided in the space. The heater may include a heat dissipating tube extending in the vertical direction, a plurality of radiating fins passing through the heat dissipating tube, extending in a direction crossing the extension direction of the discharge port, and spaced apart from each other vertically, and a heating passage formed between the plurality of radiating fins.

The discharge port and the flow guide may be provided between the radiating fin and a rear end of the upper case. The flow guide may include a guide rear end connected to the upper case, and a guide front end spaced apart from the radiating fin.

The upper case may include a tower base connected to the lower case, a first tower extending upward from the tower base and having a first discharge port, a second tower extending upward from the tower base, having a second discharge port, and forming a blowing space between the first tower, a third discharge port opened vertically in the tower base, and a guide vane provided at the third discharge port.

The third discharge port may extend in a front-rear direction from an upper surface of the tower base. A plurality of guide vanes may be provided to be spaced apart from each other in an extending direction of the third discharge port. The guide vane may be provided to be inclined forward with respect to a vertical line.

The blower may further include a diffuser provided above the fan and guiding the air discharged from the fan upward. The third discharge port and the guide vane may be located above the diffuser.

An upper surface of the tower base may be formed to be concave downward between the first tower and the second tower, and a third discharge port may be formed at the upper surface of the tower base. The third discharge port may be formed in a concave portion of the upper surface of the tower base.

The discharge port may include a first discharge port extending obliquely at the first tower and a second discharge port extending obliquely at the second tower. The flow guide may include a first flow guide provided inside the first tower and extending in a direction crossing the extension direction of the first discharge port and a second flow guide provided inside the second tower and extending in a direction crossing the extending direction of the second discharge port.

The first tower may include a first inner wall formed to be convex toward the blowing space, and the first discharge port may be formed at the first inner wall. The second tower may include a second inner wall formed to be convex toward the blowing space and the second discharge port may be formed at the second inner wall. Each of the first flow guide and the second flow guide may include a guide inner end contacting each of the first inner wall and the second inner wall.

Embodiments disclosed herein may be implemented as a blower comprising a first case having a suction port, a fan provided inside the first case, a second case provided above the first case and having an inner space through which air propelled from the fan flows, a discharge port penetrating the second case and extending in a direction in which the second case extends, and at least one flow guide provided in the inner space and extending in a direction that may be different from the direction in which the discharge port extends.

The at least one flow guide may include a plurality of the flow guides spaced apart from and aligned with each other in the direction in which the discharge port extends. The discharge port may extend along a rear end of the second case, and the flow guide may extend from the rear end of the second case toward a front end of the second case.

Each flow guide may be spaced apart in a rear direction from a front end of the second case to form a gap between the flow guide and an inner surface of the second case. The gap formed by the flow guide closest to the fan among the plurality of flow guides may be larger than the gap formed by the flow guide farthest from the fan among the plurality of flow guides. The front end of the second case may be inclined to become closer to a rear end of the second case in an upward direction. The discharge port may be inclined toward a front side in an upward direction, and the front end of the second case may be inclined to toward the flow guide in an upward direction.

The plurality of flow guides may comprise a first guide provided closest to the fan among the plurality of flow guides, the first flow guide being formed to bend downward toward a front side of the first flow guide.

Each flow guide may include a guide front end facing a front end of the second case and a guide rear end connected to a rear end of the second case. The plurality of the flow guides may include a second guide extending convexly upward from the guide rear end toward the guide front end such that the guide front end of the second guide may be positioned higher than the guide rear end of the second guide, and a third guide provided above the second guide and extending convexly upward from the guide front end toward the guide rear end such that the guide front end of the third guide may be positioned lower than the guide rear end of the third guide.

The plurality of flow guides may include a fourth guide provided farthest from the fan and extending obliquely upward in a forward direction. The plurality of the flow guides may include a fourth guide provided farthest from the fan and having a flat plate shape.

A heater may be provided in the inner space. The heater may include a heat dissipation tube extending in a vertical direction, a plurality of radiating fins through which the heat dissipation tube penetrates, the plurality of radiating fins extending in a direction different from a longitudinal direction of the discharge port and spaced apart from each other in a vertical direction, and a heating passage formed between the plurality of the radiating fins. The discharge port and the flow guide may be positioned between the radiating fins and a rear end of the second case.

The flow guide may include a guide rear end connected to the rear end of the second case, and a guide front end spaced apart from the radiating fins.

The second case may include a tower base connected to the first case, a first tower extending upward from the tower base and having a first discharge port, a second tower extending upward from the tower base and having a second discharge port, a blowing space formed between the first and second towers, a third discharge port formed at the tower base and opened in a vertical direction, and a guide vane provided at the third discharge port.

The third discharge port may extend in a front-rear direction at an upper surface of the tower base, and a plurality of the guide vanes may be spaced apart from each other in an extension direction of the third discharge port. The flow guide may be inclined toward a front side with respect a vertical direction.

A diffuser may be provided above the fan to guide air discharged from the fan upward. The third discharge port and the guide vane may be provided above the diffuser. An upper surface of the tower base may have a concave curvature between the first tower and the second tower, and the third discharge port may be formed at the upper surface of the tower base.

The second case may include a first tower, and a second tower spaced apart from the first tower to form a blowing space therebetween. The discharge port may include a first discharge port extending obliquely in a vertical direction at the first tower, and a second discharge port extending obliquely in a vertical direction at the second tower. The flow guide may include a first flow guide provided inside the first tower and extending in a direction different from an extension direction of the first discharge port, and a second guide provided inside the second tower and extending in a direction different from an extension direction of the second discharge port.

The first tower may include a first inner wall curved toward the blowing space and on which the first discharge port may be formed. The second tower may include a second inner wall curved toward the blowing space and on which the second discharge port may be formed. Each of the first flow guide and the second flow guide may include a guide inner end contacting the first inner wall or the second inner wall.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A blower, comprising:
   a lower case providing a suction port;
   a fan provided inside the lower case;
   a first tower disposed above the lower case, and providing a first discharge port;
   a second tower disposed above the lower case, providing a second discharge port, and spaced apart from the first tower to form a blowing space therebetween where discharged air from the first and second discharge ports flows;
   a tower base connecting the lower case and the first and second towers, and including an upper surface facing the blowing space;
   a third discharge port penetrating the upper surface of the tower base in an up-down direction toward the blowing space;
   a guide vane disposed at the third discharge port;
   a first airflow converter that is movably disposed at the first tower so that the first airflow converter protrudes from an inside of the first tower into the blowing space; and
   a second airflow converter that is movably disposed at the second tower so that the second airflow converter protrudes from an inside of the second tower into the blowing space.

2. The blower of claim 1, wherein each of the first and second discharge ports extends in the up-down direction, and wherein the blower further comprises:
- a first flow guide provided in an inner space of the first tower, and extending in a direction crossing a longitudinal direction of the first discharge port; and
- a second flow guide provided in an inner space of the second tower, and extending in a direction crossing a longitudinal direction of the second discharge port.

3. The blower of claim 1, wherein the first tower includes a first inner wall facing the blowing space and on which the first discharge port is formed, wherein the second tower includes a second inner wall facing the blowing space and on which the second discharge port is formed, and wherein the upper surface of the tower base connects the first inner wall and the second inner wall.

4. The blower of claim 3, wherein each of the first and second discharge ports extend in the up-down direction, wherein the first discharge port is disposed closer to a first end of the first tower than a second end of the first tower in a front-rear direction, and wherein the guide vane extends inclined toward the second end of the first tower in the front-rear direction with respect to the up-down direction.

5. The blower of claim 4, wherein each of the first and second discharge ports is disposed adjacent to a rear end of each of the first and second towers, wherein the guide vane is inclined toward a front end of each of the first and second towers, and wherein the guide vane comprises a plurality of the guide vanes spaced apart from each other to partition the third discharge port into a plurality of third discharge ports.

6. The blower of claim 5, wherein the plurality of guide vanes comprises at least four guide vanes.

7. The blower of claim 5, wherein the first and second discharge ports are inclined in the front direction with respect to the up-down direction, and wherein the plurality of guide vanes is inclined in a same direction as the first and second discharge ports are inclined.

8. The blower of claim 7, wherein a degree that the plurality of guide vanes is inclined with respect to a vertical axis (Z) is larger than a degree to which the first and second discharge ports are inclined.

9. The blower of claim 3, wherein a front end of each of the first and second inner walls is formed to be inclined in a rear direction with respect to the up-down direction, and wherein the guide vane is inclined in an opposite direction to that of the front end of each of the first and second inner walls.

10. The blower of claim 3, wherein a rear end of each of the first and second inner walls is formed to be inclined in a front direction with respect to the up-down direction, and wherein the guide vane is inclined in a same direction as that of the rear end of each of the first and second inner walls.

11. The blower of claim 1, wherein the first air flow converter is disposed closer to a front end than rear end of a first inner wall of the first tower wherein the second airflow converter is disposed closer to a front end than a rear end of a second inner wall of the second tower, and wherein the guide vane is inclined toward the first and second airflow converters with respect to the up-down direction.

12. The blower of claim 1, wherein each of the first and second airflow converters comprises:
- a board comprising a guide protrusion protruding from one surface thereof, and protruding into the blowing space;
- a board guide movably disposed inside each of the first and second towers in the up-down direction, and guiding a moving direction of the board; and
- a motor providing a drive force to the board guide, wherein the board guide comprises:
  - a rack engaged with the motor, and extending in the up-down direction; and
  - a guide slit into which the guide protrusion is inserted, and extending inclined with respect to the up-down direction, wherein when the motor drives, the board guide moves in the up-down direction, and wherein the board protrudes into the blowing space or is inserted inside of each of the first and second towers.

\* \* \* \* \*